US012571704B2

(12) United States Patent　　　　　(10) Patent No.:　US 12,571,704 B2
　　　Black　　　　　　　　　　　　　　　(45) Date of Patent:　　Mar. 10, 2026

(54) DEVICE AND METHOD FOR TESTING VESSEL PRESSURE RELIEF VALVES

(71) Applicant: Blessey Marine Services, Inc., Harahan, LA (US)

(72) Inventor: John Black, Dayton, TX (US)

(73) Assignee: Blessey Marine Services, Inc., Harahan, LA (US)

( * ) Notice: Subject to any disclaimer, the term of this patent is extended or adjusted under 35 U.S.C. 154(b) by 289 days.

(21) Appl. No.: 18/110,108

(22) Filed: Feb. 15, 2023

(65) Prior Publication Data

US 2023/0258530 A1　　　Aug. 17, 2023

Related U.S. Application Data

(60) Provisional application No. 63/310,512, filed on Feb. 15, 2022.

(51) Int. Cl.
　　*G01M 13/003*　　　(2019.01)
　　*F16K 37/00*　　　(2006.01)
(52) U.S. Cl.
　　CPC ....... *G01M 13/003* (2019.01); *F16K 37/0083* (2013.01); *F16K 37/0091* (2013.01)
(58) Field of Classification Search
　　None
　　See application file for complete search history.

(56) References Cited

U.S. PATENT DOCUMENTS

| 3,269,170 | A | | 8/1966 | Sebring et al. | |
|---|---|---|---|---|---|
| 3,981,302 | A | | 9/1976 | Veit | |
| 4,349,885 | A | | 9/1982 | Thompson | |
| 4,548,067 | A | | 10/1985 | Cox | |
| 4,557,136 | A | | 12/1985 | Greenhalf | |
| 4,570,903 | A | * | 2/1986 | Crass | G01L 5/0061 |
| | | | | | 73/168 |
| 4,840,057 | A | | 6/1989 | Bingham | |
| 5,000,040 | A | * | 3/1991 | Charbonneau | F16K 37/0083 |
| | | | | | 73/168 |
| 5,548,997 | A | * | 8/1996 | Bauer | F16K 37/0083 |
| | | | | | 73/806 |
| 5,856,615 | A | * | 1/1999 | Easter | F16K 37/0091 |
| | | | | | 73/1.72 |
| 9,528,630 | B2 | | 12/2016 | Spencer | |
| 9,851,014 | B2 | | 12/2017 | Spencer | |

(Continued)

OTHER PUBLICATIONS

ERL Commercial Marine, Inc. "6"×8" Pressure Relief Valve" 2022 ERLSALES@ERLINC.NET download from www.erlmarine.net (6 pages).

(Continued)

*Primary Examiner* — Mark A Shabman
(74) *Attorney, Agent, or Firm* — Blank Rome LLP

(57)　　　　　　　ABSTRACT

A testing device and method used on pressure relief valve while installed on an inland cargo barge to open the pressure relief valve and to determine its set lift pressure. Use of the testing device does not require the testing to be performed at a shipyard. The testing device includes a lift unit that mounts to the top of the valve's spring housing and engages the valve stem. Hydraulic pressure applied to pistons on the lift device moves the valve stem. Proper separation of plates on the lift unit indicates proper opening of the valve. The pressure reading for the applied hydraulic pressure is then correlated to the lift pressure set for the valve under test.

9 Claims, 5 Drawing Sheets

(56) References Cited

U.S. PATENT DOCUMENTS

| | | | | |
|---|---|---|---|---|
| 11,788,637 | B2 * | 10/2023 | Kalyanasundaram ....................... | F16K 17/0426 |
| | | | | 73/1.72 |
| 2004/0129054 | A1 * | 7/2004 | Hyme ..................... | F16K 17/04 |
| | | | | 73/1.72 |
| 2005/0005831 | A1 * | 1/2005 | Krason ................... | B63B 25/12 |
| | | | | 114/74 R |
| 2010/0263433 | A1 * | 10/2010 | Michel .................... | F16K 17/04 |
| | | | | 73/1.72 |
| 2015/0090003 | A1 * | 4/2015 | Lee ........................ | G05D 16/16 |
| | | | | 73/37 |

OTHER PUBLICATIONS

Ramoutar, D. et al. "Common Considerations for Pressure Safety Valve (PSV) Selection and Operation." APETT Engineering Magazine 2022, apett.org (4 pages).
ERL Commerical Marine, Inc. "Marine Products Equipment Guide, vol. IV." 2017 (220 pages).

* cited by examiner

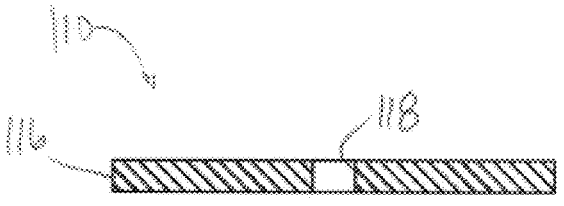
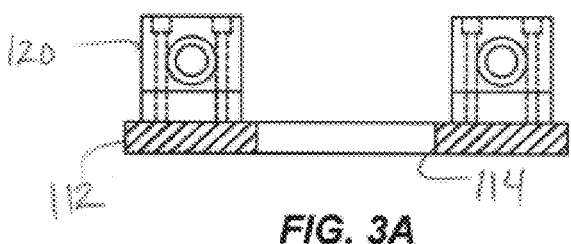
FIG. 3A
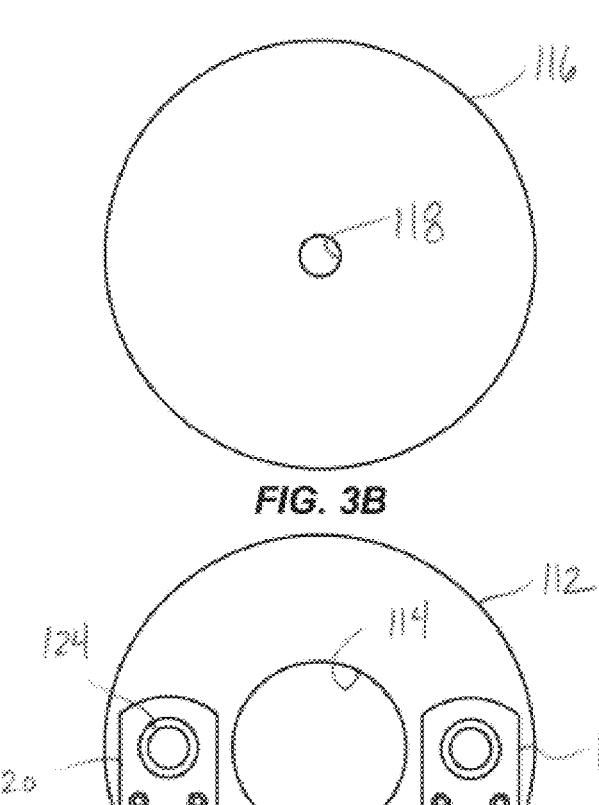
FIG. 3B
FIG. 3C

MANUFACTURER A

| Type | Seat Size (in) | Orifice Area (in2) | Required Test Pressure @ Gauge for lift pressure | | | | | |
|---|---|---|---|---|---|---|---|---|
| | | | 100 | 105 | 110 | 115 | 120 | 125 |
| A | 0.500 | 0.212 | 13 | 14 | 14 | 15 | 16 | 16 |
| B | 0.585 | 0.269 | 16 | 17 | 18 | 19 | 20 | 21 |
| C | 0.720 | 0.407 | 25 | 26 | 27 | 29 | 30 | 31 |
| D | 0.885 | 0.615 | 38 | 40 | 41 | 43 | 45 | 47 |
| E | 1.10 | 0.988 | 59 | 62 | 65 | 68 | 71 | 74 |
| F | 1.416 | 1.575 | 96 | 101 | 106 | 111 | 116 | 120 |
| G | 1.730 | 2.351 | 144 | 151 | 158 | 165 | 173 | 180 |
| M | 2.598 | 5.301 | 324 | 341 | 357 | 373 | 389 | 405 |
| N | 3.080 | 7.451 | 456 | 479 | 501 | 524 | 547 | 570 |
| O | 4.045 | 12.851 | 786 | 826 | 866 | 904 | 944 | 983 |
| P | 4.985 | 19.517 | 1194 | 1254 | 1314 | 1373 | 1433 | 1493 |
| Q | 6.380 | 31.829 | 1948 | 2045 | 2142 | 2240 | 2337 | 2435 |

MANUFACTURER B

| Type | Seat Size (in) | Orifice Area (in2) | Required Test Pressure @ Gauge for lift pressure | | | | | |
|---|---|---|---|---|---|---|---|---|
| | | | 100 | 105 | 110 | 115 | 120 | 125 |
| A | 0.953 | 0.713 | 44 | 46 | 48 | 50 | 52 | 55 |
| B | 1.123 | 0.990 | 61 | 64 | 67 | 70 | 73 | 76 |
| C | 1.435 | 1.617 | 99 | 104 | 109 | 114 | 119 | 124 |
| D | 1.711 | 2.299 | 141 | 148 | 155 | 162 | 169 | 176 |
| E | 2.133 | 3.573 | 219 | 230 | 241 | 251 | 262 | 273 |
| F | 2.400 | 4.524 | 277 | 291 | 304 | 318 | 332 | 346 |
| G | 2.627 | 5.420 | 332 | 348 | 365 | 381 | 398 | 415 |
| L | 6.315 | 31.321 | 1917 | 2012 | 2108 | 2204 | 2300 | 2396 |
| M | 6.796 | 36.295 | 2221 | 2332 | 2443 | 2554 | 2665 | 2776 |
| N | 8.306 | 54.576 | 3340 | 3507 | 3673 | 3840 | 4007 | 4174 |
| O | 10.458 | 85.899 | 5256 | 5519 | 5782 | 6045 | 6307 | 6570 |

*FIG. 4*

DEVICE AND METHOD FOR TESTING VESSEL PRESSURE RELIEF VALVES

CROSS-REFERENCE TO RELATED APPLICATION

This application claims the benefit of priority of U.S. Provisional Application Ser. No. 63/310,512 filed on Feb. 15, 2022 and entitled "Device and Method for Testing Pressure Relief Valves on Inland Cargo Barge", the content of which is relied upon and incorporated herein by reference in its entirety.

BACKGROUND OF THE DISCLOSURE

Vessels, such as inland tank barges have piping systems that handle liquid cargo. The piping systems must be tested on a routine basis. For example, annual operational tests of the piping system can be performed up to a pressure level below the maximum allowable working pressure of the piping system using the cargo as a medium. At a longer testing schedule, a static liquid pressure test can be performed on the piping system to a level of the maximum allowable working pressure.

As part of the testing, the U.S. Coast Guard requires cargo pressure relief valves to be tested on an annual basis. Conventionally, testing requires the cargo pressure relief valve to be tested in a shipyard, which may take the system out of service for at least 3-4 days to perform the test.

SUMMARY

The subject matter of the present disclosure is directed to overcoming, or at least reducing the effects of, one or more of the problems set forth above.

Accordingly, the present disclosure may provide a testing device for a pressure relief valve that comprises a lift unit configured to engage a valve stem of the pressure relief valve, and the lift unit comprises a bottom plate, a top plate, and a plurality of hydraulic presses disposed between the bottom and top plates, where the bottom and the top plates of the lift unit are configured such that the valve stem is extendable through the bottom and top plates. At least one hydraulic pump configured to produce hydraulic pressure is fluidly connected to each of the plurality of hydraulic presses of the lift unit. When the hydraulic pump produces the hydraulic pressure, the hydraulic pressure activates each of the plurality of hydraulic presses to lift the top plate axially upward away from the bottom plate by a lift distance measured between the plurality of hydraulic presses and the top plate.

The present disclosure may also provide a testing device for testing the operation of a pressure relief valve installed on a vessel. The testing device comprises a lift unit configured to engage a top end of the valve stem of the pressure relief valve, and the lift unit comprises a bottom plate, a top plate, and a plurality of hydraulic presses disposed between the bottom and top plates, wherein the valve stem extends through the bottom and the top plates. At least one hydraulic pump configured to produce hydraulic pressure is fluidly connected to each of the plurality of hydraulic presses of the lift unit. A keeper feature is configured to engage the top end of the valve stem such that the keeper feature is positioned above the top plate. The hydraulic pressure produced by the hydraulic pump activates each of the plurality of hydraulic presses to lift the top plate axially upward away from the bottom plate until the top plate meets the keeper feature, thereby defining a lift distance of the top plate measured between the plurality of hydraulic presses and the top plate.

The present disclosure may further provide a method of testing the operation of a pressure relief valve installed on a vessel. The method may comprise the steps of engaging a testing device with the pressure relief valve installed on the vessel such that a valve stem of the pressure relief valve extends through a bottom plate and a top plate of the testing device, wherein a plurality of hydraulic pressers are located between the bottom and top plates; pumping hydraulic pressure to each of the hydraulic pressers of the testing device to lift the top plate up axially away from the bottom plate until the top plate engages a keeper feature coupled to the valve stem above the top plate, such that the force on the top plate acts against the valve stem; measuring a lift distance from the hydraulic pressures to the top pressure plate; and comparing the measured lift distance to a predetermined distance or distance range that will lift the valve stem of the pressure relief valve.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIG. 3A is a cross-sectional view of a lift unit for the testing device.

FIG. 3B is a plan view of a top plate for the lift unit.

FIG. 3C is a plan view of a bottom plate and hydraulic pistons for the lift unit.

FIG. 4 shows calibration charts for the testing device used on example cargo pressure relief valves from different valve manufacturers.

DETAILED DESCRIPTION OF THE DISCLOSURE

The present disclosure relates to a testing device, system, and method for testing the operation of pressure relief valves of a piping system in situ, that is while the piping system remains installed on board a vessel. The testing device 100 can be used on a pressure relief valve while installed on a vessel, such as an inland cargo barge, to open the pressure relief valve and to determine its set lift pressure. Use of the testing device 100 according to the present disclosure does not require the testing to be performed at a shipyard. The testing device 100 generally includes a lift unit 110 that mounts to the top of the valve's housing and engages the valve stem of the relief valve. Hydraulic pressure applied to the lift unit 110 moves the valve stem of the pressure relief valve to open the valve. Proper separation or lift distance of plates of the lift unit 110 indicates proper opening of the relief valve. The pressure reading for the applied hydraulic pressure can then be correlated to the lift pressure set for the valve under test.

Figure 1:
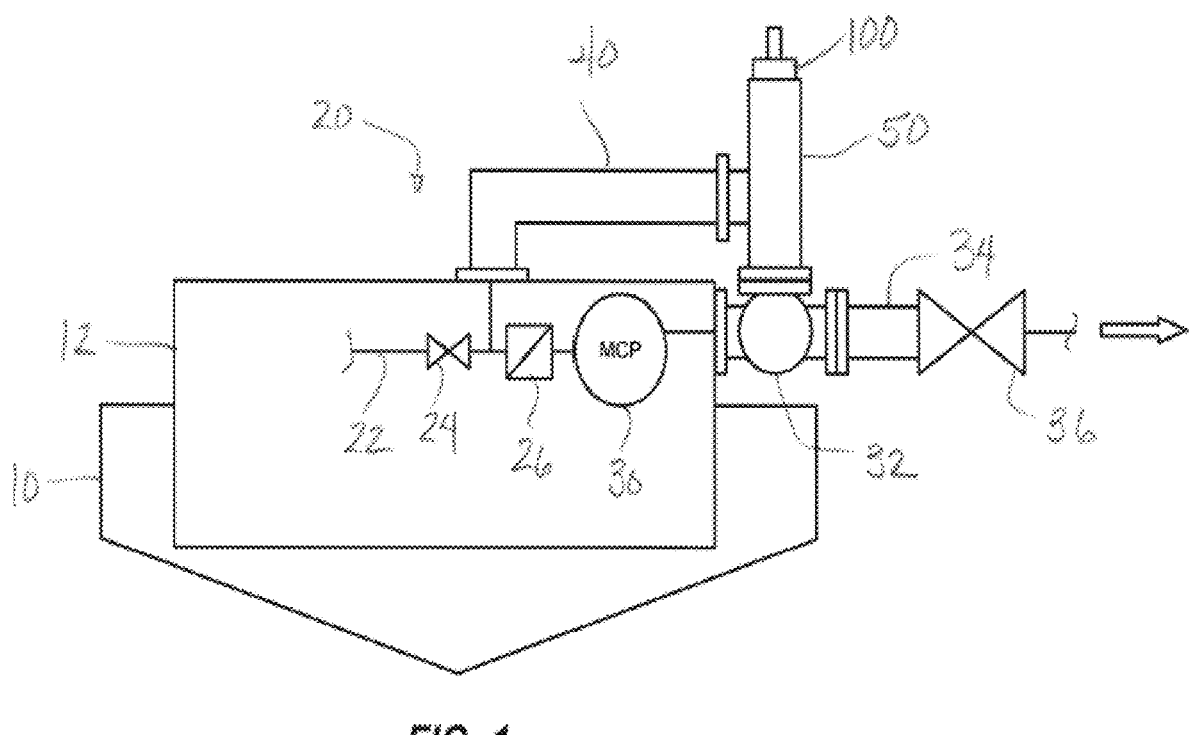
FIG. 1 is a schematic view of a cargo vessel having a pumping system to pump liquid cargo.

FIG. 1 is a schematic view of a cargo vessel 10, such as an inland tank barge, having a cargo transfer piping system 20 designed to pump liquid cargo from a cargo hold or tank 12 to a destination on land. The cargo transfer piping system 20 has piping or suction line 22 with control valves 24, check valves 26, and one or more pumps 30 for drawing liquid from the tank 12. The pumped liquid passes from an outlet 32 to external piping 34 for delivering the liquid to the destination, such as a pressure vessel or the like.

For the cargo pump discharge, a pressure relief valve 50 is fitted between the discharge of the cargo pump 30 and a shut-off valve 36. The discharge from the pressure relief valve 50 is piped in a return line 40 back to the suction line 22 of the piping system or pump 20 or returned to the tank 12. The pressure relief valve 50 can be set at or below a maximum design pressure of the piping system 20, the piping, discharge hose, etc. Accordingly, in response to the pressure exceeding a predetermined level during discharge, the pressure relief valve 50 connected to the outlet 32 can divert the liquid from the outlet 32 through the return line 40 back to the cargo piping 22. The outlet 32, the pressure relief valve 50, and the return piping 40 can be part of the barge 10.

A testing device 100 in accordance with the present disclosure is configured for testing the cargo pressure relief valve 50 on the barge 10, such as testing the operation, the sealing, and the relief pressure of the valve 50. The testing device 100 allows required, regulatory testing to be performed on the pressure relief valve 50 while onboard the barge 10 in a minimally invasive manner, without the need to perform the testing in a shipyard.

For example, the testing device 100 can be used when performing an annual operational test of the cargo transfer piping system 20 to a defined threshold. Depending on the inland tank barge 10, the type of cargo, and the rating of the piping system 20, this pressure level can be, for example, 100 psi (i.e., 80% of the maximum allowable working pressure). Other implementations may have different pressure levels and allowable working pressures.

In some implementations on an inland cargo barge 10 as in FIG. 1, the pressure relief valve 50 is set to open at a predetermined pressure level, such as 125 psi. The cargo pumps 30 of the piping system 20 themselves may be unable to go over a certain pressure level, such as 100 psi. Attempting to open the pressure relief valve 50 while on the cargo barge 10 by using pumped fluid would require intentionally over-speeding or over-loading the pumps 30 or running the pumps 30 under undesired operations, in order to force the valve 50 to open and relieve the pressure. This would risk significant damage to the piping system including the valve 50. The testing device 100 of the present disclosure, instead opens the pressure relief valve 50 by lifting an internal seat 62 (FIG. 2B) from a nozzle 54 (FIG. 2B) inside the pressure relief valve 50 and determining the corresponding lift pressure associated with opening the pressure relief valve 50.

As noted, this testing can be performed on the barge 10 and thus can be done without requiring the testing to be performed in a shipyard. Accordingly, the testing can be performed on the pressure relief valve 50 while in place on the barge 10, such as an interim form of testing between any rebuilds and recertifications required for the pressure relief valve 50 and the barge's piping system 20. In this way, the testing can be completed by personnel, annually, without the barge 10 being taken out of service for 3-4 days. As a result, there are no shipyard costs, and there is less disruption to operating schedules. Because the testing by testing device 100 is controlled, the chances of damaging the pressure relief valve 50 from failure to have the valve's seat 62 reseat on closing are lower. Moreover, there are fewer cleaning and waste disposal issues with the testing provided by the testing device 100.

Figure 2A:
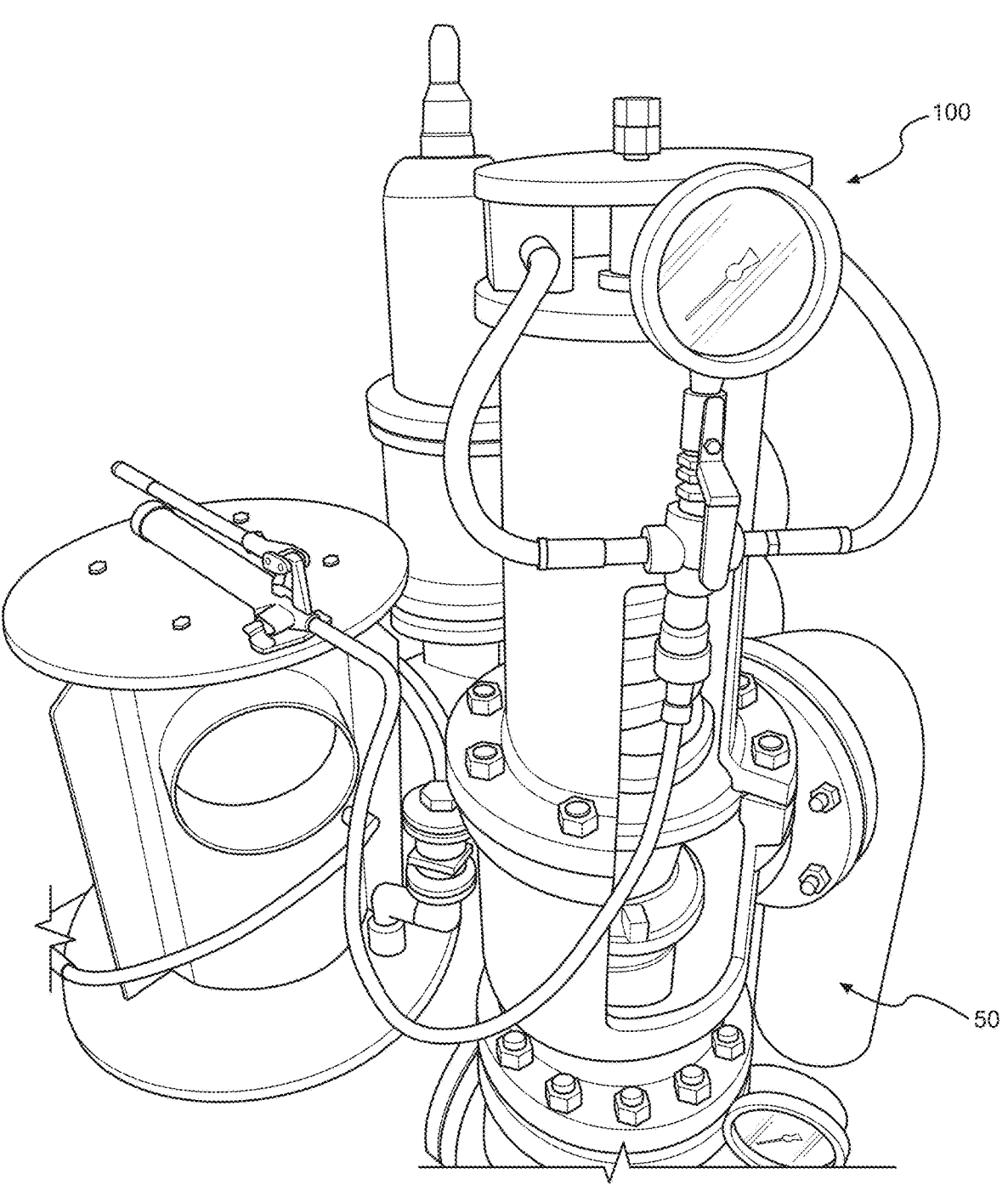
FIG. 2A illustrates a testing device mounted on a cargo pressure relief valve for a cargo vessel.
Figure 2B:
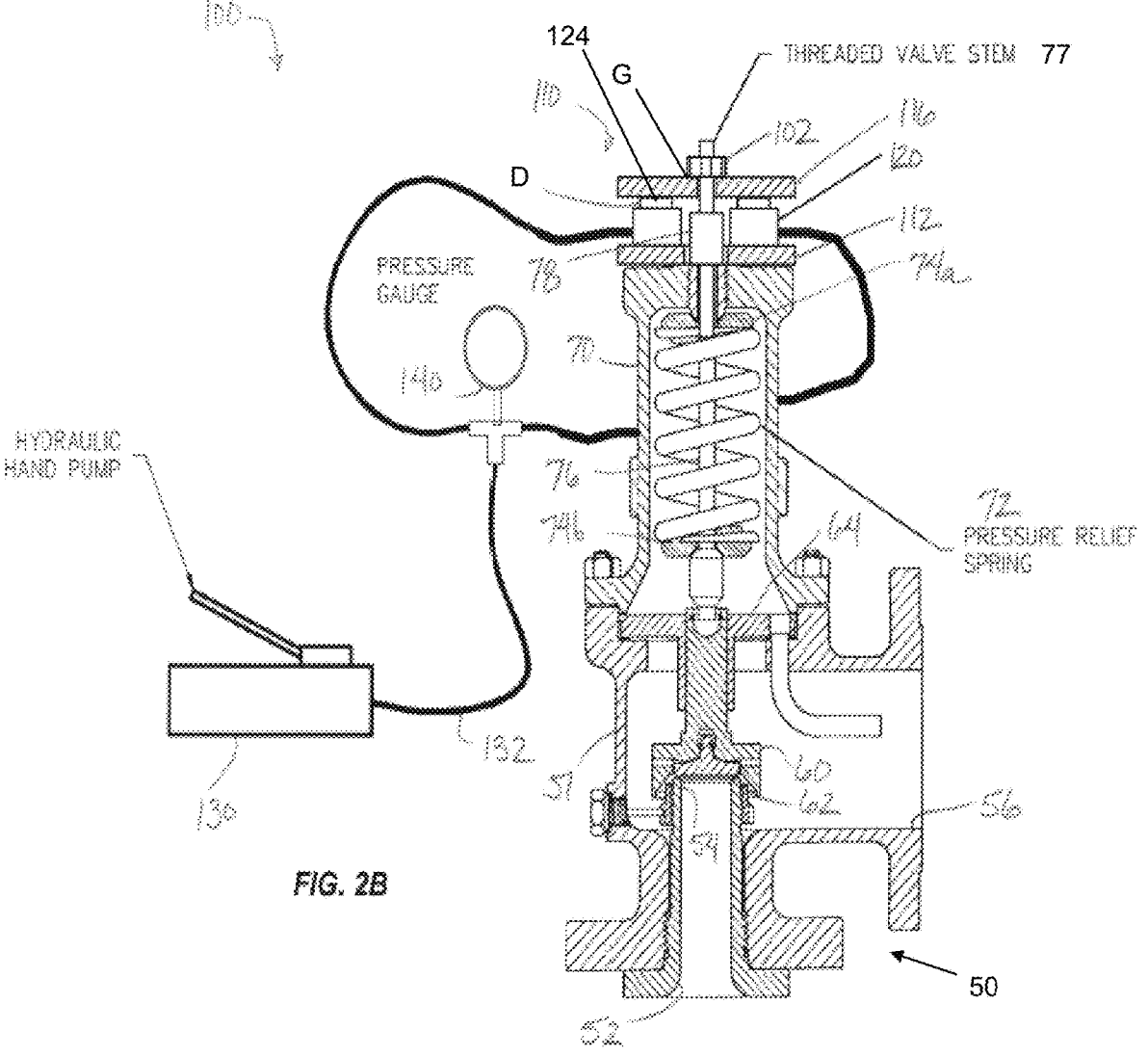
FIG. 2B is a schematic view of the testing device mounted on the cargo pressure relief valve.

FIG. 2A illustrates the testing device 100 mounted on an example of a cargo pressure relief valve 50 for a cargo vessel, and FIG. 2B is a schematic view of the testing device 100 mounted on the cargo pressure relief valve 50. In general, the pressure relief valve 50 includes a valve body 51 having a pump port 52 and a tank port 56. The pump port 52 has a nozzle or orifice 54 that communicates with the cargo piping system, and the tank port 56 connects to return piping for the vessel's tank.

A valve seal having a disk seat 62 disposed on a seal holder 60 can be moved relative to the valve nozzle 54 to control the flow of liquid from the pump port 52 to the tank port 56. A sleeve guide 64 separates the interior of the valve body 51 from a spring bonnet or housing 70. The valve 50 may be configured to allow the interior of the spring bonnet 70 to be exposed to the fluid pressure, or the valve 50 may be configured for corrosive or fouling fluids use a balanced spring-loaded operation in which the bonnet 70 and the spring 72 are protected from the fluid. Depending on the type of valve, bellows (not shown) can be used between the sleeve guide 64 and the disk seat 62, and other seals can be used to isolate liquid and pressure in the valve body 71 from the spring bonnet 70.

A valve stem 76 passes through spring buttons 74a-b in the spring bonnet 70, and a distal end of the valve stem 76 engages the seal holder 60. A spring 72 is supported between the spring buttons 74a-b. The spring 72 surrounds the valve stem 76 and controls the bias against the seal support 60 and seat 62. An adjustment screw 78 on the valve stem 76 sets the compressive force of the spring 72 and sets the opening pressure required to lift the valve seat 62 from the nozzle 54. Typically, a cap (not shown) on top of the spring bonnet 70 covers the exposed end of the valve stem 76 and the adjustment screw 78. During operation, upstream pressure at the pump port 52 and the spring 72 apply opposite forces on the seat 62 and controls its sealing with the nozzle 54.

As shown in FIGS. 2A and 2B, the testing device 100 includes a lift unit 110 and a hydraulic pump 130. The lift unit 110 includes a bottom plate 112, a top plate 116, and a plurality of hydraulic presses, such as pistons 120 that are disposed between the plates 112 and 116.

FIG. 3A is a cross-sectional view of the lift unit 110, showing the bottom plate 112, the top plate 116, and one or more hydraulic pressers 120, e.g. two pistons. FIG. 3B is a plan view of the top plate 116, and FIG. 3C is a plan view of the bottom plate 112 and hydraulic pistons 120. Although the plates 112 and 116 are shown has having a circular shape with generally the same diameter, the plates 112 and 116 can be other shapes, such as square, and can be different shapes and/or sizes. The bottom plate 112 includes a central opening 114 that can accommodate the adjustment screw 78 (FIG. 2B) on the valve stem 76 of the pressure relief valve 50. The pistons 120 can be disposed on opposing sides of the central opening 114 of the bottom plate 112 and can include mounts to affix the hydraulic pistons 120 in place. The hydraulic pistons 120 can have hydraulic connections 122 and rams or piston members 124. The top plate 116 also has a central opening 118 that accommodates the exposed end of the valve stem 76 on the pressure relief valve 50.

Returning to FIGS. 2A and 2B, the hydraulic pump 130 is configured to be capable of producing at least predetermined hydraulic pressure, such as 1500 psi of hydraulic pressure. Hydraulic lines 132 connect from the hydraulic pump 130 to the hydraulic pistons 120 on the lift unit 110. A pressure gauge 140, which can be an analog or digital pressure gauge, can measure the applied pressure in the lines 132, such as to a pressure range of 100-1500 psi.

In the testing procedure, the cap (not shown) of the pressure relief valve 50 is removed to expose the valve stem 76. The bottom plate 112 is placed on an upper end of the valve, namely on the upper support of the relief valve's housing or spring bonnet 70, such that the adjustment screw 78 of the valve 50 extends through the central opening 114 of the bottom plate. The hydraulic pistons 120 connected to the hydraulic pump 130 are installed on the bottom plate 112. The orientation is not critical as long as the pistons 120 are substantially symmetrically arranged, such as on opposing sides. The top pressure plate 116 is then installed on top of hydraulic pistons 120, such that the threaded end 77 of the valve stem 76 extends through the central opening 118 of the top plate 116. The top and bottom plates 116 and 112 are not substantially axially aligned with the valve stem 76 extend through the central openings 118 and 114 of each plate. A keeper feature, such as nut 102 can then be threaded onto the exposed end 77 of the valve stem 76, such that the keeper feature 102 is above the top plate 116, thereby restricting or limiting the amount of axial movement of the top plate 116 upward. A gap G (FIG. 2B), such as approximately a ¼ inch gap (about 6.35 mm), can be left between the upper surface of the top plate 116 and the bottom of the keeper nut 102.

Hydraulic pressure can be applied to the hydraulic pistons 120 using the hydraulic pump 130 to pump fluid through lines 132 to the hydraulic pistons 120. As pressure is pumped via the pump 130, the top pressure plate 116 is lifted up axially away from the bottom plate and along the valve stem 76 by the rams 124 of the hydraulic pistons 120. The upper surface of the top pressure plate 116 eventually engages the bottom of the keeper nut 102, and force on the top plate 116 then acts against the valve stem 76. This axial movement of the top pressure plate 116 can be monitored during the pumping via pump 130. When the top plate 116 can no longer move axially up during pumping via pump 130, the pumping is then stopped, and a lift distance D (FIG. 2B) from the top of the hydraulic pistons 124 to the bottom surface of the top pressure plate 116 is measured to determine if the lift distance D falls within a predetermined or specified distance or distance range that will lift the seat 62 in the pressure relief valve 50 off of the nozzle 54 of the valve body 51. For some implementations, this measured lift distance D can be between 16-25 mm (about 0.60-1 inch) for the seat 62 to lift off of the nozzle 54 in the valve body 51. Other implementations involving different valves 50 may require different distances for the measured lift distance D.

If the measured lift distance D is less than the specified distance or distance range, e.g. less than 16 mm, then the seat 62 and the valve stem 76 have not been lifted sufficiently. In this case, the hydraulic pressure is released from the hydraulic pistons 120, and the keeper nut 102 is threaded up on the valve stem 72 by the amount of measured lift distance D, e.g. less than 16 mm. If the measured lift distance D is more than the specified distance or distance range, e.g. more than 25 mm, the hydraulic pressure is released from the hydraulic pistons 120, and the keeper nut 102 is threaded further down on the valve stem 72 by the amount of the measured distance D, e.g. over 25 mm.

The steps are then repeated as needed by pumping, stopping the pumping when the movement of the top plate 116 stops, and measuring the lift distance D until the lift distance D meets the specified distance or distance range, e.g. between 16-25 mm, while the pressure relief valve 50 is fully open. The pressure reading from the gauge 140 is then recorded when the pressure relief valve 50 has fully opened and the lift distance D of the lift unit 110 is between the specified distance or range.

The entire testing process can be repeated multiple times to produce the required lift distance D and to take several pressure readings, which can then be averaged. The averaged pressure reading recorded to fully open the relief valve 50 is then compared to the pressure reading values calibrated for the corresponding pressure relief valve 50.

The calibrated relief valves 50 can be from various manufacturers and will have different sizes for the seats 62 and different orifice areas for the nozzle 54. The calibrated relief valves 50 can also be set to different lift pressure, such as 100, 105, 110, 115, 120, and 125 psi. The test pressure readings measured at the gauge 140 can be correlated to the actual lifting pressure of the valve seat 62 from the nozzle 54 to verify that the pressure relief valve 50 is functioning properly.

FIG. 4 shows calibration charts for the testing device 100 used on example cargo pressure relief valves from different valve manufacturers. Calibration information is shown for two example valve manufacturers (A & B) having various models with different seat sizes and orifice areas. The calibration information depends on the manufacture of the pressure relief valves, the model and ratings of the pressure relief valve, the seat size, the orifice area of the nozzle, the diameters of the rams for the hydraulic pistons 120 used on the lift unit 110, the set lift pressure of the spring 72 in the valve 50, and the like.

In the examples shown here, the diameter of the ram 124 for the hydraulic pistons 120 is 1.02 in (about 25 mm). The models or types of valves from the manufacturers are listed with their seat size (in.) and orifice area (in$^2$.). The required testing pressure obtained at the pressure gauge 140 during testing with the lift unit 110 on the valve is given for the different lift pressure settings (e.g., 100, 105, 110, 115, 120, and 125 psi). Operators can ensure that the test pressure from the testing procedure for the type of valve from the manufacturer matches the listed pressure on the chart for the corresponding lift pressure to which the subject valve is to be set. For example, a test of a type P valve from manufacturer A set with a lift pressure of 120 psi should produce a testing pressure at the gauge during the testing procedure of 1433 psi. As will be appreciated, the comparison may allow for discrepancies in tolerances (plus or minus a certain amount of psi) as needed.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as right, left, above, below, upper, lower, top, bottom, linear, arcuate, elongated, parallel, perpendicular, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. A method of testing an operation of a pressure relief valve installed on a vessel, the method comprising:

engaging a testing device with the pressure relief valve installed on the vessel such that a valve stem of the pressure relief valve extends through a bottom plate and a top plate of the testing device, wherein a plurality of hydraulic presses are located between the bottom plate and the top plate;

pumping hydraulic pressure to each of the plurality of hydraulic presses of the testing device to lift the top plate up axially away from the bottom plate to engage a keeper feature coupled to the valve stem above the top plate, such that a force on the top plate acts against the valve stem;

measuring a lift distance of the top plate;

comparing the lift distance to a predetermined distance or distance range that will lift the valve stem of the pressure relief valve;

releasing the hydraulic pressure from the plurality of hydraulic presses; and moving the keeper feature up on the valve stem based on the lift distance being less than the predetermined distance or distance range.

2. The method of claim 1, further comprising monitoring an upward axial movement of the top plate while the hydraulic pressure is being applied to the testing device.

3. The method of claim 1, further comprising stopping the pumping when the top plate meets the keeper feature.

4. The method of claim 3, further comprising repeating the pumping, the stopping the pumping, and the measuring the lift distance until the lift distance meets the predetermined distance or distance range.

5. The method of claim 1, wherein a seat of the valve stem lifts off of a nozzle in a valve body of the pressure relief valve when the top plate is lifted.

6. The method of claim 1, wherein the keeper feature is moved up on the valve stem by the lift distance.

7. The method of claim 1, further comprising taking a pressure reading for the hydraulic pressure and then correlating the pressure reading to a lift pressure set for the pressure relief valve.

8. The method of claim 1, wherein the vessel is a cargo barge, and the pressure relief valve is part of a piping system installed on the cargo barge.

9. A method of testing an operation of a pressure relief valve installed on a vessel, the method comprising:

engaging a testing device with the pressure relief valve installed on the vessel such that a valve stem of the pressure relief valve extends through a bottom plate and a top plate of the testing device, wherein a plurality of hydraulic presses are located between the bottom plate and the top plate;

pumping hydraulic pressure to each of the plurality of hydraulic presses of the testing device to lift the top plate up axially away from the bottom plate to engage a keeper feature coupled to the valve stem above the top plate, such that a force on the top plate acts against the valve stem;

measuring a lift distance of the top plate;

comparing the lift distance to a predetermined distance or distance range that will lift the valve stem of the pressure relief valve;

releasing the hydraulic pressure from the plurality of hydraulic presses; and moving the keeper feature down on the valve stem based on the lift distance being more than the predetermined distance or distance range.

* * * * *